Dec. 14, 1948.  W. F. SPECK  2,456,156
COTTON CLEANER

Original Filed Oct. 20, 1944  3 Sheets-Sheet 1

INVENTOR.
WILLIAM F. SPECK
BY
J. H. Weatherford
atty.

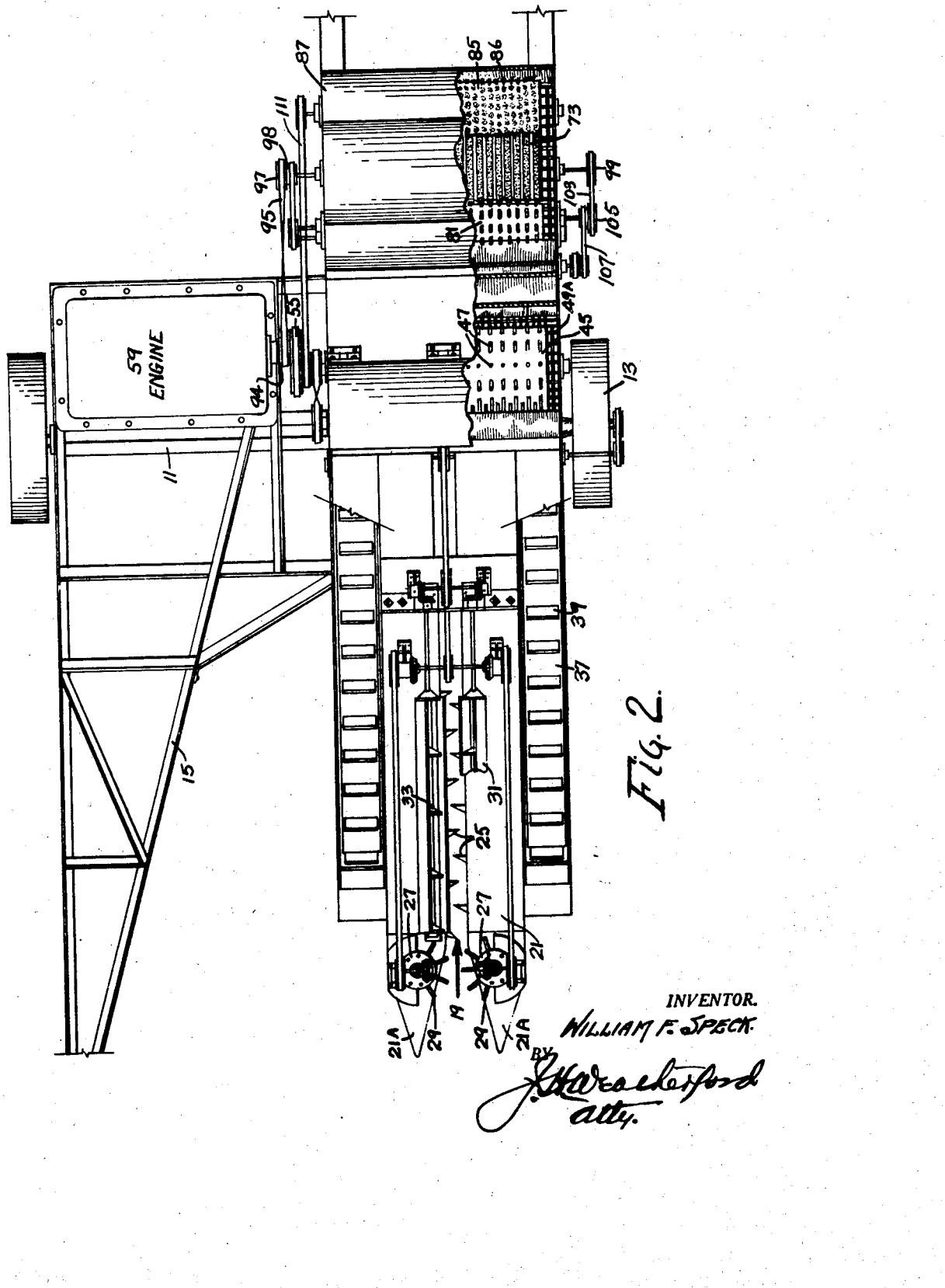

Dec. 14, 1948.    W. F. SPECK    2,456,156
COTTON CLEANER
Original Filed Oct. 20, 1944    3 Sheets-Sheet 3
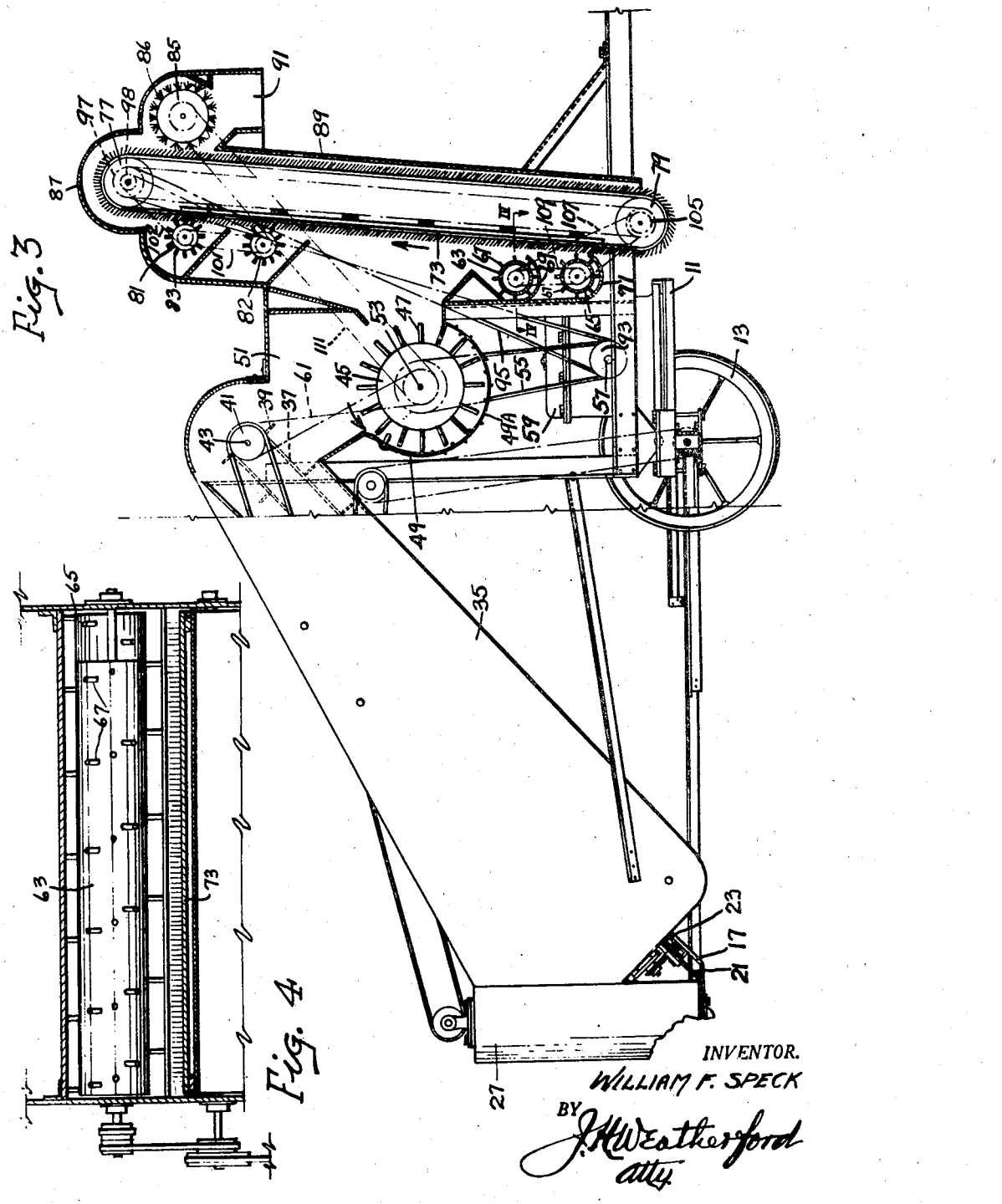
INVENTOR.
WILLIAM F. SPECK
BY
J. H. Weatherford
atty.

Patented Dec. 14, 1948

2,456,156

UNITED STATES PATENT OFFICE 2,456,156

COTTON CLEANER

William F. Speck, West Memphis, Ark.

Original application October 20, 1944, Serial No. 559,515. Divided and this application May 31, 1946, Serial No. 673,397

3 Claims. (Cl. 19—36)

This invention relates to new and useful improvements in means for cleaning cotton, and particularly in cotton cleaners of portable type used in conjunction with a cotton harvester in which the cotton bolls are stripped from the plants and conveyed to the cleaning mechanism in which the cotton is separated from bolls and trash and such detritus left in the field. This application is a division of my pending application Serial Number 559,515, filed October 20, 1944, for improvements in Cotton harvesters.

The objects of the invention are:

To provide means by which cotton may be satisfactorily cleaned in the field;

To provide, in conjunction with a cotton harvester, means for conveying the harvested cotton to cleaning mechanisms through which the cotton may be separated from the bolls and other trash, and delivered into a receptacle;

To provide means for breaking up the bolls and trash and for separating the cotton therefrom; and To generally improve the design and construction of such a machine.

The means by which the foregoing and other objects are accomplished and the manner of their accomplishment will be readily understood from the following specification upon reference to the accompanying drawings, in which:

Fig. 2 is a plan view, with portions of the housing of my cleaning apparatus shown broken away to reveal the details thereof.

Fig. 3 is a sectional elevation of the cleaner; and

Figure 1:
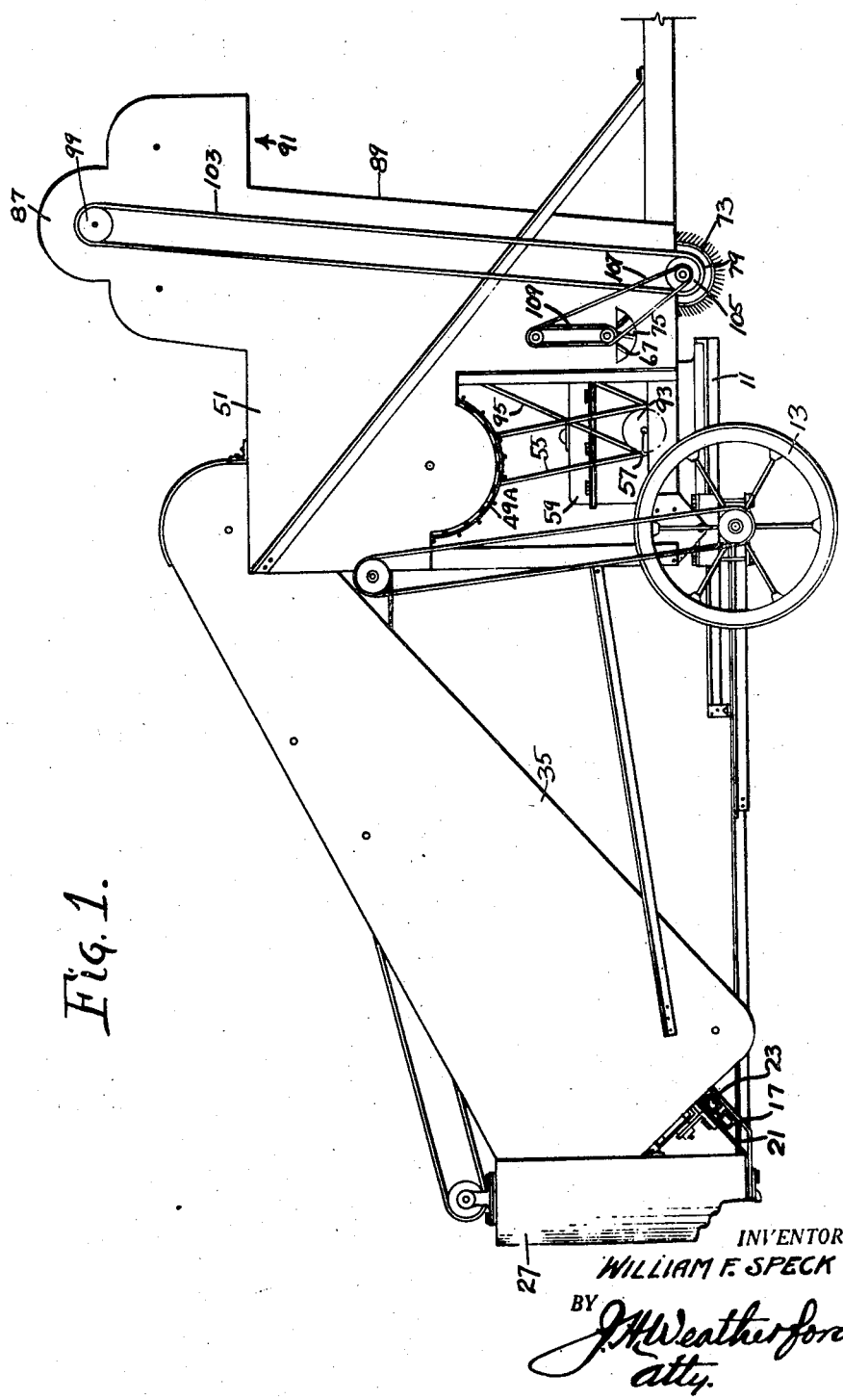
Fig. 1 is a side elevation of my improved machine.

Fig. 4 a fragmentary sectional plan on an enlarged scale, taken on the line IV—IV of Fig. 3.

Referring now to the drawings in which the various parts are indicated by numerals:

11 are members of a frame, carried by wheels 13, the frame preferably having additional members 15 extending from one side thereof to form a hitch adapted to be coupled to a tractor or other source of motive power, not here shown. Offset from the hitch the frame carries the cleaning mechanism, here illustrated in its preferred form in conjunction with a harvester of the type described in co-pending application Serial Number 559,515, of which this is a division.

The harvester mechanism, while shown here somewhat in detail, is, for the purposes of this application, intended to be illustrative only. As here shown it includes a pair of transversely horizontal plates 17, spaced apart to form a slot 19 for receiving cotton plants, a second pair of plates 21 above and parallel to plates 17, and similarly spaced apart. These pairs of plates serve as housing for chain belts 23, carrying fingers 25. The pairs of plates are further shown as converging to form nose portions 21A, shaped to present a V-shaped approach to slot 19. Mounted on nose portions 21A are vertical feeder drums 27, each carrying a plurality of vertical blades 29. The drums are provided with appropriate driving means by which blades 29 may be driven backward and along the edges of slot 19, which driving means may be coordinated with the speed of wheels 13, to effect timing of the speed of the blades therewith in the manner described in my aforementioned application Serial Number 559,515.

As the machine is operated, it is driven with the harvester in position to engage the cotton bolls. Means are provided for cutting or beating the bolls from the plants, here shown as strippers comprising knives 31 carried by heads 33 and being provided with appropriate driving means.

35 are the outer side walls housing the harvesting mechanism, and preferably form a part of the housing for conveyor belts 37, which carry conveyor flights 39. The belts 37 at their upper ends pass around drum 41, which is mounted on and driven by shaft 43, the conveyor belts being positioned and adapted to receive the bolls and cotton beaten or cut from the plants and to transfer them upwardly and rearwardly to a transversely disposed breaker drum 45.

The breaker drum 45 has a plurality of protruding spikes 47 and is housed in an open top arcuate housing 49 which spans transversely between the side walls 51 which are preferably alined with side walls 35, and may be continuations thereof. The lower portion 49A of the drum housing is an open mesh screen through which trash and broken up bolls may readily pass. Breaker drum 45 is mounted on a shaft 53, preferably journalled in bearings carried by the side walls and driven through a belt 55 from the shaft 57 of an engine 59, preferably mounted on the offset portion of the frame. Shaft 43 of conveyor belt drum 41 is driven through a cross-belt 61 from shaft 53 of the breaker drum.

Rearwardly of breaker drum 45 and below the level thereof are shredders arranged one above the other, these shredders including drums 63 and 65 each disposed transversely of the machine and having shafts journalled in bearings carried by side walls 51. The drums carry spikes 67, preferably arranged in spiral flight (Fig. 4).

These flights are oppositely pitched on the two drums, and serve not only to break up the cotton delivered to them, but also to distribute it transversely across the machine. The shredders are disposed in arcuate troughs 69, 71 which are forwardly closed, but rearwardly open facing a carding belt 73 disposed in proximity to the spikes 67 of the drums and having its proximate flight upwardly driven. The upper trough 69 extends from one side wall toward, but terminates short of, the other side wall to permit cotton shifted by drum 63 to drop into lower trough 71. Lower trough 71 extends from the latter side wall and terminates for discharge short of the first side wall or otherwise discharges through an opening 75 in that wall.

The carding belt 73 is a continuous belt carried at its upper and lower ends by transversely disposed belt drums 77, 79, which are mounted on shafts journalled in bearings carried by side walls 51, the belt being of width to extend substantially from side wall to side wall, and preferably having upper drum 77 slightly rearward of lower drum 79 to establish a minor rearward divergence of the belt from bottom to top, which accomplishes a desired slightly greater spacing of upper shredder drum 63 from the belt than the spacing of lower shredder drum 65 therefrom.

Adjacent the upper carding belt drum 77 are a pair of combers, comprising drums 81, 82 having projecting blades 83, the drums being mounted with the blades in proximity to the teeth of the carding belt, these drums being driven in opposite direction to the direction of travel of the belt and serving to detach trash carried upward with the lint.

Rearward of the carding belt is a brush comprising a drum 85, having projecting tufts of bristles 86. The combers, the upper end of the carding belt and the brush are preferably enclosed by a cover 87 and the casing for the carding belt completed by a transverse rear wall 89. The lint detached by the brush is discharged through a spout 91 into such receptacle as may be provided therefor.

The shaft 57 of engine 59 carries a pair of pulleys 93, 94 which respectively drive the belt 55 through which the breaker drum 45 is driven, and a cross belt 95 which drives a pulley 97 on the shaft of upper drum 77. Also mounted on the same shaft adjacent pulley 97 is a pulley 98 and at its opposite end a pulley 99. The combers 81, 82 are coupled by a driving belt 101 and both are driven by a belt 102 from pulley 98, belt 102 being here shown as overlying belt 101. The pulley 99 of the upper carding drum 77, through a belt 103 drives a pulley 105 on the shaft of lower drum 79, this shaft in turn being drivingly coupled by a belt 107 to shredder drums 63, 65, these drums being preferably additionally drivingly coupled by a belt 109. The brush 85 is driven through a belt 111 from a suitable pulley on shaft 53 of the breaker drum.

It will be understood that the belt drives here shown are illustrative only and that other types of drive may be substituted therefor.

In operation, the machine is advanced along a row of cotton, and the cotton and bolls removed from the plants. The cotton and bolls are carried upwardly and rearwardly by conveyor flights 39 and discharged onto breaker drum 45 which breaks up the bolls, twigs, and other trash and largely discharges them through screen 49A, discharging the partially cleaned cotton against carding belt 73 and onto upper shredder drum 63 by which it is further broken up and traversed across the face of the belt, discharging surplus and trash onto lower shredder drum 65, by which it is oppositely traversed and the trash dropped out at the end of underlying trough 71 through opening 75. During these traversing movements, the belt teeth comb off the lint cotton and carry it upward, this being so effectually done that only trash is discharged through opening 75.

Cotton carried upward by the belt is combed by comber blades 83 and such cotton as is dislodged with the trash descends along the face of the carding belt and is eventually recaptured and again taken up. The cotton is eventually carried over upper drum 77 and is dislodged from the belt by brush 85 and discharged through chute 91 into the receptable provided.

I claim:

1. Cotton cleaning means including a spiked breaker drum, an open top housing for said drum, said housing having a perforate bottom section for escape of trash broken up by said drum and having a portion extending rearwardly from said perforate section to provide a discharge chute, shredder means disposed rearwardly of and lower than said breaker drum to receive discharge from said chute, said shredder means including a pair of vertically alined superposed drums, having protruding spikes in oppositely pitched spiral flights, said shredder drums projecting rearwardly beyond the discharge end of said chute, and a housing rearwardly open enclosing the front and lower portions of said shredder drums, said lower housing portions being open for discharge at opposite ends, an endless carding belt, carried by upper and lower pulleys positioned and spaced apart to establish substantially upright belt flights, diverging rearwardly from the vertical alinement of said shredder drum said belt being disposed rearward of said shredder drums with its forward flight in substantially contacting adjacency to the rearward spikes of the lower of said shredder drums and spaced rearwardly from the discharge end of said chute a distance in excess of the radius of said shredder drums to provide an unobstructed vertical pathway to the upper said shredder drum for material discharged from said chute, said chute being positioned below the vertical mid point of said belt, combing means comprising bladed drums, disposed in adjacency to the upper end of said forward flight, a rotary brush disposed in contacting adjacency to the rear flight of said belt below the top of said belt, and means for driving said breaker, said shredder drums, said combing drums, said carding belt and said brush, said driving means being coordinated to drive said shredder drum spirals to traverse materials engaged thereby toward the opposite discharge openings of their said housings, and to drive the forward flight of said carding belt upward.

2. Cotton cleaning means including a spiked breaker drum, an open top housing for said drum, said housing having a perforate bottom section for escape of trash broken up by said drum and having a portion extending rearwardly from said perforate section to provide a discharge chute, a shredder drum disposed rearwardly of and lower than said breaker drum to receive discharge from said chute, said shredder drum projecting rearwardly beyond the discharge end of said chute and having protruding spikes in a spiral flight, a housing rearwardly open, enclosing the front and lower portions of said shredder drum, said lower portion being cut away for discharge at one end, an endless carding belt, carried by upper and lower pulleys, positioned and spaced apart to establish substantially upright flights, said belt being disposed rearward of said shredder drum with its forward flight in adjacency to said shredder drum and spaced rearwardly from the discharge end of said chute a distance in excess of the radius of said shredder drum to provide an unobstructed vertical pathway to said shredder drum for material discharged from said chute, a bladed combing drum, disposed in adjacency to the upper end of said forward flight, a rotary brush disposed in contacting adjacency to the rear flight of said carding belt below the top of said belt, and means for driving said breaker, shredder and combing drums, said carding belt pulleys and said brush; said driving means being coordinated to drive said shredder drum spiral to traverse materials engaged thereby toward the discharge opening of said housing, and to drive the forward flight of said carding belt upward.

3. Cotton cleaning means including rotary breaker means, an open top housing for said breaker means, said housing having a perforate bottom section for escape of trash and having a portion extending rearwardly from said perforate section to provide a discharge chute, shredder means disposed rearwardly of and lower than said breaker means to receive discharge from said chute, said shredder means projecting rearwardly beyond the discharge end of said chute and including means for effecting shift of material longitudinally, and housing means rearwardly open enclosing the front and lower portions of said shredder means, and open for discharge at one end, an endless carding belt, carried by upper and lower pulleys, positioned and spaced apart to establish substantially upright flights, said belt being disposed rearward of said shredder means with its forward flight in adjacency to said shredder means and spaced from the discharge end of said chute to provide an unobstructed vertical pathway from said chute to said shredder means for material discharged from said chute, rotary combing means disposed in adjacency to the upper end of said forward flight, a rotary brush disposed in contacting adjacency to the rear flight of said belt, and means for driving said breaker, combing and stripper means, said carding belt pulleys and said brush; said driving means being coordinated to drive said shredder means to traverse materials engaged thereby toward the discharge opening of said housing and the forward flight of said carding belt upward.

WILLIAM F. SPECK.

REFERENCES CITED

The following references are of record in the file of this patent:

UNITED STATES PATENTS

| Number | Name | Date |
|---|---|---|
| 1,605,940 | Hancock | Nov. 9, 1926 |
| 1,630,638 | Streun | May 31, 1927 |
| 1,652,459 | Riza | Dec. 13, 1927 |
| 1,709,715 | Farley | Apr. 16, 1929 |
| 1,750,439 | Streun | Mar. 11, 1930 |